United States Patent
Sitter

[15] 3,690,052
[45] Sept. 12, 1972

[54] LIMB HOLDER
[72] Inventor: Spencer B. Sitter, Box 415, McLean, Tex. 79057
[22] Filed: Feb. 9, 1971
[21] Appl. No.: 113,928

[52] U.S. Cl. ................................................56/328
[51] Int. Cl. ............................................H01g 19/00
[58] Field of Search ............56/328, 328 TS; 294/103

[56] References Cited

UNITED STATES PATENTS

| | | |
|---|---|---|
| 1,472,262 | 10/1923 | Abildgaard..............56/328 TS |
| 2,542,665 | 2/1951 | Gustofson ..............56/328 TS |
| 3,457,713 | 7/1969 | Plummer................56/328 TS |

FOREIGN PATENTS OR APPLICATIONS 640,981   6/1962   Italy..........................56/328 R

*Primary Examiner*—Russell R. Kinsey
*Attorney*—Charles W. Coffee

[57] ABSTRACT

In harvesting fruit, individual limbs of a tree are vibrated at their natural frequency, or a harmonic, so the fruit is removed therefrom. The limb is clamped firmly in a V-notch holder with a gate resiliently held in place so the limb is not damaged when the vibrator is vibrating the limb, or when the limb, at its natural frequency, is vibrating the holder.

22 Claims, 5 Drawing Figures

PATENTED SEP 12 1972 3,690,052
SHEET 1 OF 2
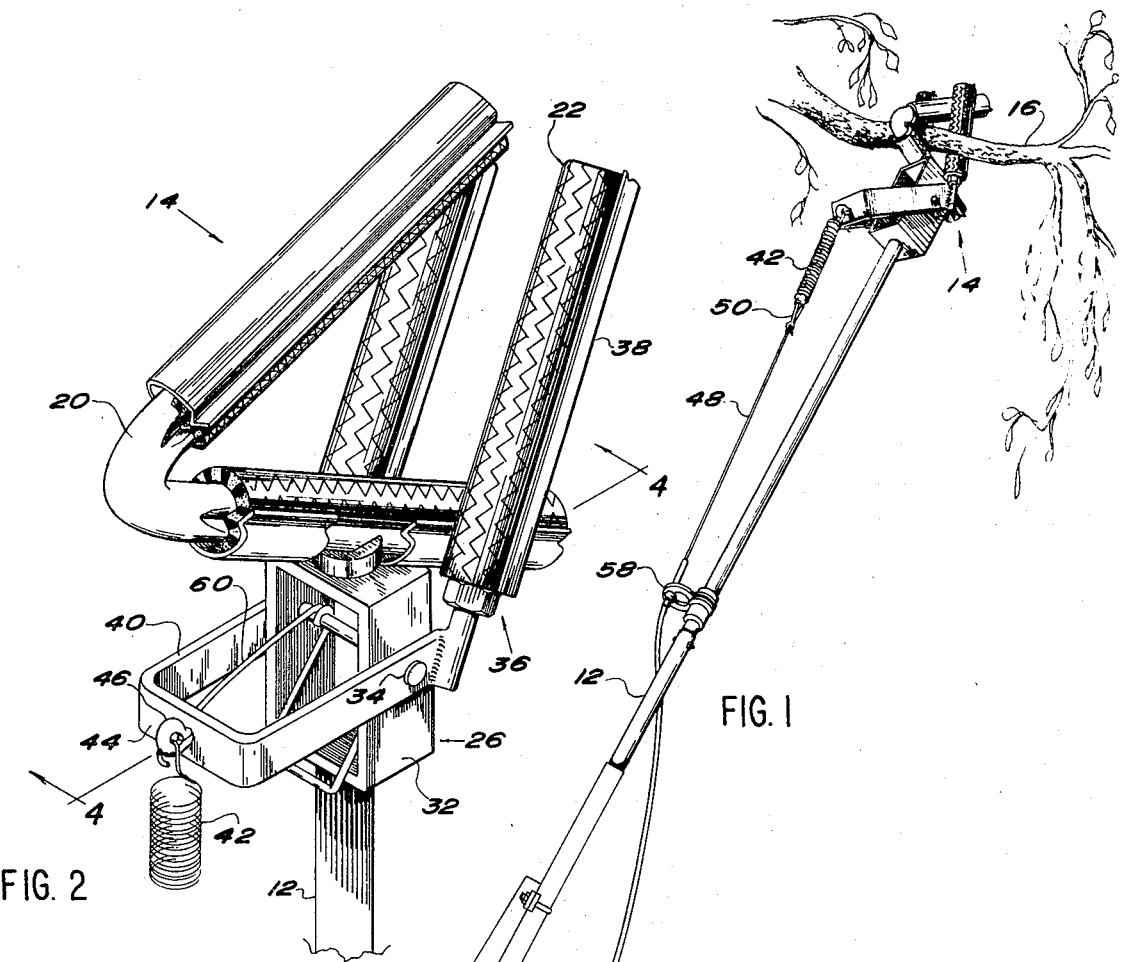
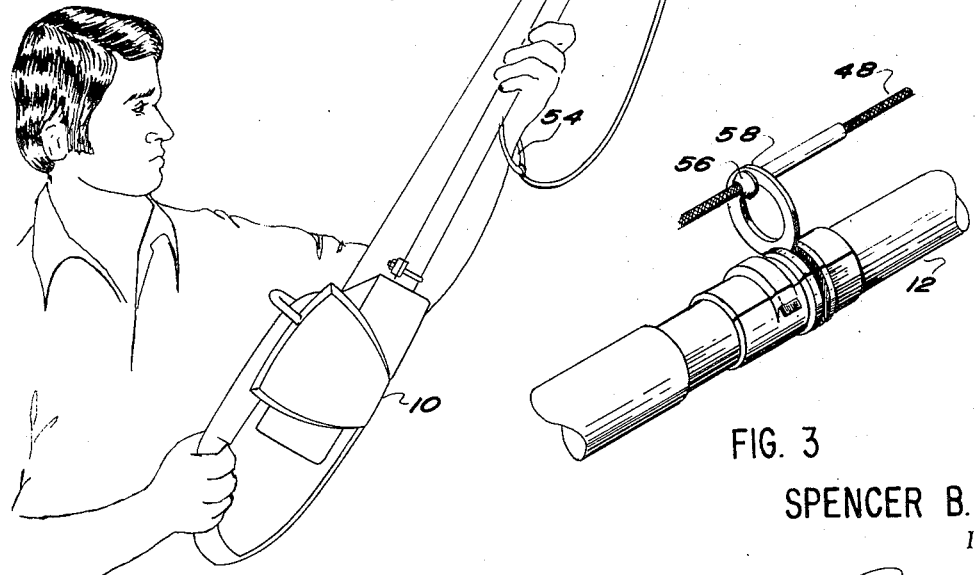
FIG. 1
FIG. 2
FIG. 3
SPENCER B. SITTER
INVENTOR.
BY *C. W. Moffee*
   *Atty.*

SPENCER B. SITTER
INVENTOR.

LIMB HOLDER

CROSS-REFERENCE TO RELATED APPLICATIONS:

This application discloses an improvement to my prior application, Ser. No. 49,077 to a Limb Shaker filed June 23, 1970.

BACKGROUND OF THE INVENTION

Field of the Invention

This invention relates to harvesting fruit and more particularly to a vibrator for vibrating the limbs of a tree to shake the fruit therefrom.

Heretofore, workers in the art have suggested that individual branches could be shaken to shake the fruit from the tree. Examples of this are shown in Londo U.S. Pat. No. 3,174,269 and Plummer U.S. Pat. No. 3,457,713.

Machines for this purpose are commercially on the market: Homelite Harvester Model XLH–1 by the Homelite Division of Textron, Port Chester, New York.

The above references connect to the limb by V-shaped fingers which go over the limb. Also, my prior patent application discloses a similar attachment. My prior application also discloses the vibration of the limb at the natural frequency of the limb for greater amplitude or vigor in the shaking with less power input.

Abildgaard U.S. Pat. No. 1,472,262 discloses a holder having a V-notch with a gate clamp and the gate clamp held closed by a rope.

Of course similar clamps are found in other arts. e.g., Gaertner U.S. Pat. No. 1,052,234 discloses a similar clamp for holding test tubes.

Other prior art developments which might be of interest include Fleckner U.S. Pat. No. 1,337,398 and Wilcox U.S. Pat. No. 3,346,293.

SUMMARY OF THE INVENTION

New and Different Function

I have developed a clamp particularly designed to work in cooperation with my vibrator as disclosed in my prior application. The clamp uses the same basic V-shaped fingers to fit over the limb. However, the limb is held within the V-notch by a pivoted gate which in the open position is approximately aligned with one of the fingers, but which can be closed by pulling on a cable which is attached to a spring connected to a spur on the gate. In this way the gate can be positively closed to hold the limb in the V-notch, but the limb is not held in the V-notch by a non-yielding mechanism. I.e., the gate is resiliently held in place so it can yield.

This harvester or vibrator for trees is particularly adapted for removing fruit from olive trees inasmuch as it is extremely difficult to remove the fruit from the tree; furthermore the trees are quite valuable and it is especially important not to damage the limbs of the tree. The holder may be moved from one limb to another rapidly. I find this particularly necessary to prevent damage to valuable trees, such as olive, particularly when operating at a frequency which equals the natural frequency of the limb. I.e., when the vibration is at the natural frequency of the limb, the vibration of the limb is not forced, but merely induced by the vibrator and at such frequency, it is difficult to say whether the limb holder is vibrating the limb or the limb is vibrating the holder. Therefore, this peculiarly firm but resilient holder transmits the inducing vibration to the limb, yet prevents damage to the limb.

OBJECTS OF THE INVENTION

An object of this invention is to shake fruit from the limb of a tree.

Another object is to hold the limb while inducing vibration in a manner to effectively induce vibration to the limb and to prevent damage to the limb.

Further objects are to achieve the above with a device that is sturdy, compact durable, lightweight, simple, safe, efficient, versatile, and reliable, yet inexpensive and easy to manufacture, operate, and maintain.

Still further objects are to achieve the above with a method that is versatile, rapid, efficient, and inexpensive, and does not require skilled people to adjust, operate, and maintain.

Still further objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWINGS

FIG. 1 is a perspective view of a device according to this invention in use.

FIG. 2 is an enlarged perspective view of the line holder portion of the device.

FIG. 3 is an enlarged perspective detail of the latch for the cable of the device.

DESCRIPTION OF THE PREFERRED EMBODIMENT

Figure 4:
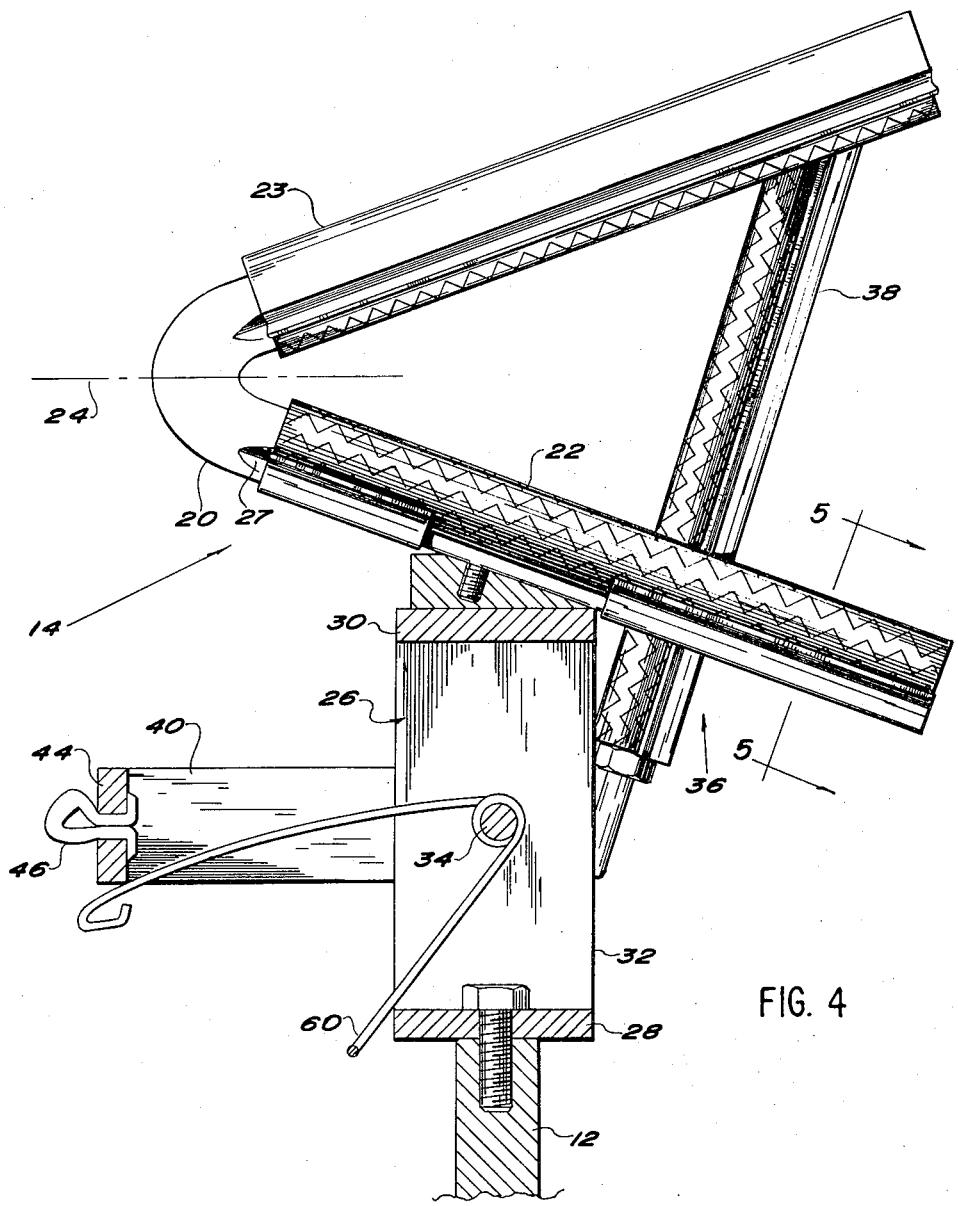
FIG. 4 is an enlarged sectional view of the limb holder taken on line 4—4 of FIG. 2.

According to this disclosure, there is means for causing vibration which is depicted in FIG. 1 as hand-held internal combustion motor 10 which is attached to boom 12. Limb holder 14 on the end of the boom 12 engages limb 16 of a tree. Operation of a throttle (not shown) on the vibrator 10 causes it to change speeds; therefore, changing the frequency of vibration of the boom 12. The boom 12 vibrates axially and induces vibrations into the limb 16. The frequency of vibration produced by the vibrator 10 is changed until the natural frequency (or a harmonic thereof) of the limb is reached. The operator knows when the natural frequency is reached because of the amplitude or violence with which the limb vibrates. This vibration will cause the fruit upon the limb 16 to fall off.

Figure 5:
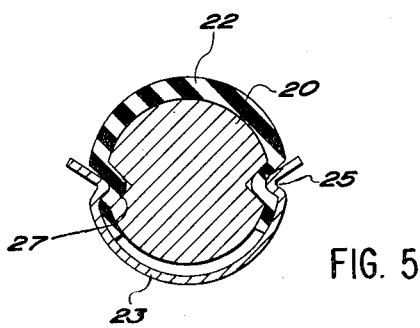
FIG. 5 is an enlarged cross-sectional view of one limb holder bar taken substantially on line 5—5 of FIG. 4.

The limb holder 14 includes V-shaped metal bar 20, the angle of the V being about 45°. The bar 20 is covered with tough, resilient material 22 such as bicycle tires. I have found bicycle tires to be readily available yet wear resistant and resilient so there is no harm done to the tree limbs. The covering 22 is held upon each of the legs or arms of the bar 20 by clip 23. The clip is C-shaped in cross-section as seen if FIG. 5, although it is elongated. The clips have a fold or bend 25 which pushes the covering 22 into a pair of diametrically opposed notches 27 which extend the length of each bar 20. Likewise, covering 22 is held in place over each gate portion 38 in this manner. It will be noted that the 45° angle of the V-shaped bar 20 is large enough so that the limb will not become wedged in the V-notch. If the V-notch is less than about 35°, the limb will become wedged in the V and not readily removed, but must be forced out.

The V-shaped bar 20 has one leg or arm connected to the end of the boom so the median line or the axis of the V (shown in dash-line 24, FIG. 4) is substantially at right angles to the longitudinal axis of the boom 12. Also, the axis 24 of the V is in the same plane as the axis of the boom 12, which means the V itself lies in the same plane. The connection of the bar 20 to the boom 12 is about mid-point of one of the legs of the V; therefore, the vibration of the holder 14 will be transverse the axis 24.

The connection between the bar 20 and the boom 12 is by box-shaped metal strap 26, as illustrated. One side 28 of box 26 is attached to the end of the boom 12 and opposite side 30 is attached to the bar 20 and the other two sides 32 have pin 34 extending through them. Latch or gate 36 is pivoted by the pin 34 to the sides 32 of the box 26. The gate includes main latch or gate portion 38 which is rubber covered and which, in the closed position, extends across the axis 24 of the V-shaped bar. In the closed position, gate portion 38 is like the cross-bar of a capital A. Therefore, with a limb within the V-notch, the gate or retainer 38 holds the limb in place. When the gate 36 is open, the gate portion 38 extends from one of the sides of the V so the limb holder 14 can be readily placed over the limb 16.

Spur 40 on the gate 36 shapes the entire gate 36 to resemble a bell crank. Helical tension spring 42 is attached to the end of the spur 40.

Specifically referring to the structure of the gate 36, it is biforcated with the bight 44 being at the end of the spur 40, and the gate portions 38 extend to the outside of the box 26, all as illustrated in the drawing. The spring 42 is attached through an eye of clip 46 which is attached to bight 44.

Cord or cable or other flexible tension element 48 is attached by snap 50 to one end of the spring 42, the other end of the spring 42 being attached to the spur 40 of the gate 36. The cable 48 extends along the boom 12 through guides (not shown for clarity) to loop 54 on the end of the cable 48. This loop 54 is adapted to fit around the wrist of the operator. The cable 48 also has a ferrule or protuberance 56, which works in connection with catch 58 on the boom. I have found braided nylon cord a satisfactory material for the cable 48.

Open spring 60 extends from the bight 44 of the spur 40 around pin 34 to the boom side 28 of the box 26 and operates to bias the gate portion 38 in the open position. The open spring 60 is a much weaker spring than the spring 42.

OPERATION

When the cable 48 (which is an operator for the spring 42) is relaxed, the gate 36 is open. The holder 14 is placed over a limb so the limb 16 goes into the open V. The portion 38 of the gate can be used to help guide the limb 16 into the V. As soon as it is in place, and with the loop 56 around the wrist of the person holding the machine, the movement of the wrist downward will cause the spring 42 to exert tension upon the spur 40 which will close the gate portion 38. The protuberance 56 can be brought over catch 58 so the gate 36 is held by a predetermined amount of strain upon the helical spring 42 and therefore, there will be a predetermined amount of force or tension or stress upon the gate portion 38 holding the limb 16 within the notch.

If the engine has not been previously started, the holder 14 will hold the entire mechanism onto the limb 16 while the engine is started. After the mechanism is started, the speed of the vibrator 10 is adjusted until the natural or a harmonic frequency of the limb 16 is reached and the fruit shaken from the limb. After the fruit is shaken from the limb and the speed of the vibrator 10 is reduced and if the person operating the mechanism needs to perform some other chore or task, he can leave the entire mechanism hanging from the tree during the time of performing some other task. It is emphasized that the gate 36 will exert sufficient pressure or tension upon the limb 16 to hold the mechanism in place, but it will not be unyielding so as to damage the limb 16.

Thereafter, as soon as the operator is ready to remove the limb holder 14 from the limb 16, movement of his wrist in the loop 54 will remove the protuberance 56 from the catch 58 and then relaxation of the tension upon the cable 48 will cause relaxation of the spring 42, which will permit open spring 60 to open the gate portion 38 and the V portion of the holder 14 comes loose from the limb. It is again emphasized that the angle of the V is such that the limb 16 will not be held in the holder 14 by friction. Thereafter, the person harvesting the fruits from the tree moves the holder on to another limb to shake the fruit from that limb.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The method of engaging a limb to shake fruit therefrom comprising
    a. engaging the limb with a holder having three parts,
    b. two of such parts being rigidly attached together to form a V,
    c. the engagement of the limb with the two rigid parts being such that the limb is not frictionally held within the angle of the V,
    d. holding the limb within the V portion with a gate,
    e. resiliently urging the gate toward the apex of the V, thus f. resiliently holding the limb adjacent to the apex of the V, and g. vibrating the holder with the direction of vibration being transverse to the axis of the V.

2. In a limb shaker including
a. a boom connected to
b. vibration means for axially vibrating the boom,
c. the improved limb holder connected to the end of the boom comprising:
d. a V-shaped bar member having legs or arms,
e. the axis of the V being transverse to the longitudinal axis of the boom,
f. a retaining gate pivoted relative to the bar member,
g. the gate extending across the opening of the V when closed, and
h. extending in alignment with one leg of the V when open,
j. a spur on the gate,
k. an operating member moveably mounted on the boom,
m. close spring means having two ends for biasing the gate closed,
n. one end of the closing spring means attached to the spur,
o. the other end of the closing spring means is attached to the operating member, so that
p. movement of the operating member in one direction relaxes the closing spring means to allow the gate to open and
q. movement of the operating member in the other direction tensions the closing spring means to bias the gate closed.

3. The invention as defined in claim 2 wherein said vibration means is further
r. means for vibrating a limb attached in the holder at its natural frequency.

4. The invention as defined in claim 2 with the additional limitation of
r. open spring means interconnecting the gate and the holder for biasing the gate open.

5. The invention as defined in claim 2 with the additional limitation of
r. the axis bisecting the V-shaped bar member being at about right angles to the axis of the boom.

6. The invention as defined in claim 2 with the additional limitations of
r. said closing spring means being an elongated helical spring and
s. said operating member being a cable extending along the boom.

7. The invention as defined in claim 6 with the additional limitation of
t. a loop on the end of the cable to fit around a wrist of a person holding the limb shaker.

8. The invention as defined in claim 6 with the additional limitations of
t. a catch on the boom,
u. a protuberance on the cable so the cable may be latched to the catch in position to maintain the closing spring means in tension.

9. The invention as defined in claim 2 with the additional limitation of
r. the V-shaped bar member forming an angle of about 45°.

10. The invention as defined in claim 2 with the additional limitation of
r. said V-shaped bar member forming an angle greater than that wherein friction would prevent removal of a limb therefrom.

11. The invention as defined in claim 10 with the additional limitation of
s. open spring means interconnecting the gate and the holder for biasing the gate open.

12. The invention as defined in claim 10 with the additional limitation of
s. the axis bisecting the V-shaped bar member being at about right angles to the axis of the boom.

13. The invention as defined in claim 10 with the additional limitations of
s. said closing spring means being an elongated helical spring and
t. said operating member being a cable extending along the boom.

14. The invention as defined in claim 13 with the additional limitation of
u. a loop on the end of the cable to fit around a wrist of a person holding the limb shaker.

15. The invention as defined in claim 13 with the additional limitations of
v. a catch on the boom,
w. a protuberance on the cable so the cable may be latched in position to maintain the closing spring means in tension.

16. The invention as defined in claim 10 wherein said vibration means is further
s. means for vibrating a limb attached to the holder at its natural frequency.

17. The invention as defined in claim 16 with the additional limitation of
t. open spring means interconnecting the gate and the holder for biasing the gate open.

18. The invention as defined in claim 17 with the additional limitation of
u. the axis bisecting the V-shaped bar member being at about right angles to the axis of the boom.

19. The invention as defined in claim 18 with the additional limitations of
v. said closing spring means being an elongated helical spring and
w. said operating member being a cable extending along the boom.

20. The invention as defined in claim 19 with the additional limitation of
x. a loop on the end of the cable to fit around a wrist of a person holding the limb shaker.

21. The invention as defined in claim 20 with the additional limitations of
y. a catch on the boom,
z. a protuberance on the cable so the cable may be latched in position to maintain the closing spring means in tension.

22. The invention as defined in claim 21 with the additional limitation of
aa. the V-shaped bar member forming an angle of about 45°.

* * * * *